US011627139B2

(12) United States Patent
Halun et al.

(10) Patent No.: US 11,627,139 B2
(45) Date of Patent: *Apr. 11, 2023

(54) SYSTEM, DEVICE, AND METHOD FOR TRANSFERRING SECURITY ACCESS PERMISSIONS BETWEEN IN-CAMERA USERS

(71) Applicant: MOTOROLA SOLUTIONS, INC., Chicago, IL (US)

(72) Inventors: Jakub Halun, Cracow (PL); Lukasz Chrzaszcz, Cracow (PL); Patryk Zmigrodzki, Cracow (PL); Lukasz Cebula, Nowysacz (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,035

(22) Filed: May 6, 2022

(65) Prior Publication Data

US 2022/0263836 A1   Aug. 18, 2022

Related U.S. Application Data

(63) Continuation of application No. 16/619,232, filed as application No. PCT/PL2017/050039 on Aug. 11, 2017, now Pat. No. 11,374,936.

(51) Int. Cl.
| | | |
|---|---|---|
| *H04L 9/40* | (2022.01) | |
| *G06F 3/04817* | (2022.01) | |
| *G06F 3/0482* | (2013.01) | |
| *G06F 3/04883* | (2022.01) | |
| *G06F 21/32* | (2013.01) | |

(Continued)

(52) U.S. Cl.
CPC .......... *H04L 63/104* (2013.01); *G06F 3/0482* (2013.01); *G06F 3/04817* (2013.01); *G06F 3/04883* (2013.01); *G06F 21/32* (2013.01); *G06F 21/6218* (2013.01); *G06V 40/166* (2022.01); *G06V 40/172* (2022.01); *H04N 23/63* (2023.01)

(58) Field of Classification Search
CPC ..................................................... H04L 63/104
See application file for complete search history.

(56) References Cited

U.S. PATENT DOCUMENTS

| | | |
|---|---|---|
| 9,104,302 B2 | 8/2015 | Chai et al. |
| 9,584,653 B1 * | 2/2017 | Lyren .................. G06F 3/04842 |

(Continued)

FOREIGN PATENT DOCUMENTS

WO    2016038378 A1    3/2016

*Primary Examiner* — Roland J Casillas

(57) ABSTRACT

A process for transferring security access permissions between in-camera users includes capturing, at an electronic computing device via an image capture device, an image of two or more in-camera users. A first in-camera user and a second in-camera user are identified n the image. An input gesture identifying the first in-camera user as a source of security access permissions and the second in-camera user as a destination of security access permissions is detected. Responsively, the electronic computing device causes a first particular security access permission associated with the first in-camera user to be applied to and modify a current set of security access permissions associated with the second in-camera user.

20 Claims, 6 Drawing Sheets

(51) Int. Cl.
*G06F 21/62* (2013.01)
*G06V 40/16* (2022.01)
*H04N 23/63* (2023.01)

(56) References Cited

U.S. PATENT DOCUMENTS

| | | | | |
|---|---|---|---|---|
| 2011/0081923 | A1* | 4/2011 | Forutanpour | G06F 1/1694 |
| | | | | 455/457 |
| 2011/0277012 | A1* | 11/2011 | Carter | H04L 63/10 |
| | | | | 726/1 |
| 2012/0163679 | A1* | 6/2012 | Gavita | H04N 21/25875 |
| | | | | 382/118 |
| 2014/0359789 | A1 | 12/2014 | Pitt | |
| 2016/0103494 | A1* | 4/2016 | Zehler | G06F 3/1292 |
| | | | | 358/1.15 |
| 2017/0053106 | A1* | 2/2017 | Serrato | G07C 9/257 |

\* cited by examiner

SYSTEM, DEVICE, AND METHOD FOR TRANSFERRING SECURITY ACCESS PERMISSIONS BETWEEN IN-CAMERA USERS

This application is a continuation of U.S. patent application Ser. No. 16/619,232, filed on Dec. 4, 2019, which itself is a National Stage filing under 35 USC § 371 of Patent Cooperation Treaty international application having Serial No. PCT/PL2017/050039 (the 'PCT international application') filed on Aug. 11, 2017. This application claims priority to both the US application and the PCT international application, the entire contents of both of which are incorporated herein by reference.

BACKGROUND OF THE INVENTION

Tablets, laptops, phones, mobile or portable radios, and other mobile electronic computing devices are now in common use by users, such as government officers (including firemen, police officers, and paramedics, among others), and provide such users with instant access to increasingly valuable additional information and resources such as vehicle histories, arrest records, outstanding warrants, health information, information (such as location) about colleagues, direct reports, or other personnel, and other information that may aid the user in making a more informed determination of an action to take or how to resolve a situation, among other possibilities. Many times, these communication devices may include an integrated camera and display for capturing events and interacting with an environment surrounding the user as the user completes his or her assigned tasks and performs other functions.

One function that many users, including government officers, may regularly perform is an assignment or distribution of access permissions. Such access permissions may be granted to a particular user (and thus to all devices the user is associated with and/or logged into or authenticated by) or to particular devices associated with the particular user, and may allow the user to access particular limited-access information databases and/or allow the user to perform particular limited-access functions.

Such limited-access information databases may include, for example, information regarding current location of a civilian or work colleague, access lists for accessing particular restricted areas or buildings, personally identifiable information such as home address, phone number, or birth date of a civilian or work colleague, or historical incident information (including audio, video, text notes, etc.) regarding a past work-related or public safety related event or occurrence. Limited-access information public safety databases may include public safety incident-staffing information, incident-related personnel location information, incident-related personnel assigned roles, incident-related personnel contact information, and incident-related public safety radio frequency (RF) channel assignment information.

Limited-access functions may include, for example, assigning another work colleague to a particular location to address a particular event or occurrence, filing a report or uploading information (including audio, video, text notes, etc.) regarding a particular event or occurrence to a remote location for storage and/or archiving, or controlling an automated vehicle such as a land-based or air-based drone. Limited-access public safety functions may include, for example, dispatching a group of officers to an incident, joining a particular talkgroup, talking in a particular talkgroup (e.g., obtaining the floor), assigning a patrol beat to a particular officer, or requesting an arrest or search warrant.

Conventionally, manual processes are used to modify access permissions of other users, such as by manually accessing a text-based access control list (ACL) and selecting people from the list of names and then selecting or de-selecting a particular set of rights associated with the selected people. However, this manual process tends to be difficult if the user making the access rights changes does not know the name of the person to which he or she is attempted to modify access rights, is time consuming, and tends to be error prone due to the manual data entry manner of making the changes.

Thus, there exists a need for a technical method, device, and system for improved transfer of security access permissions between users.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
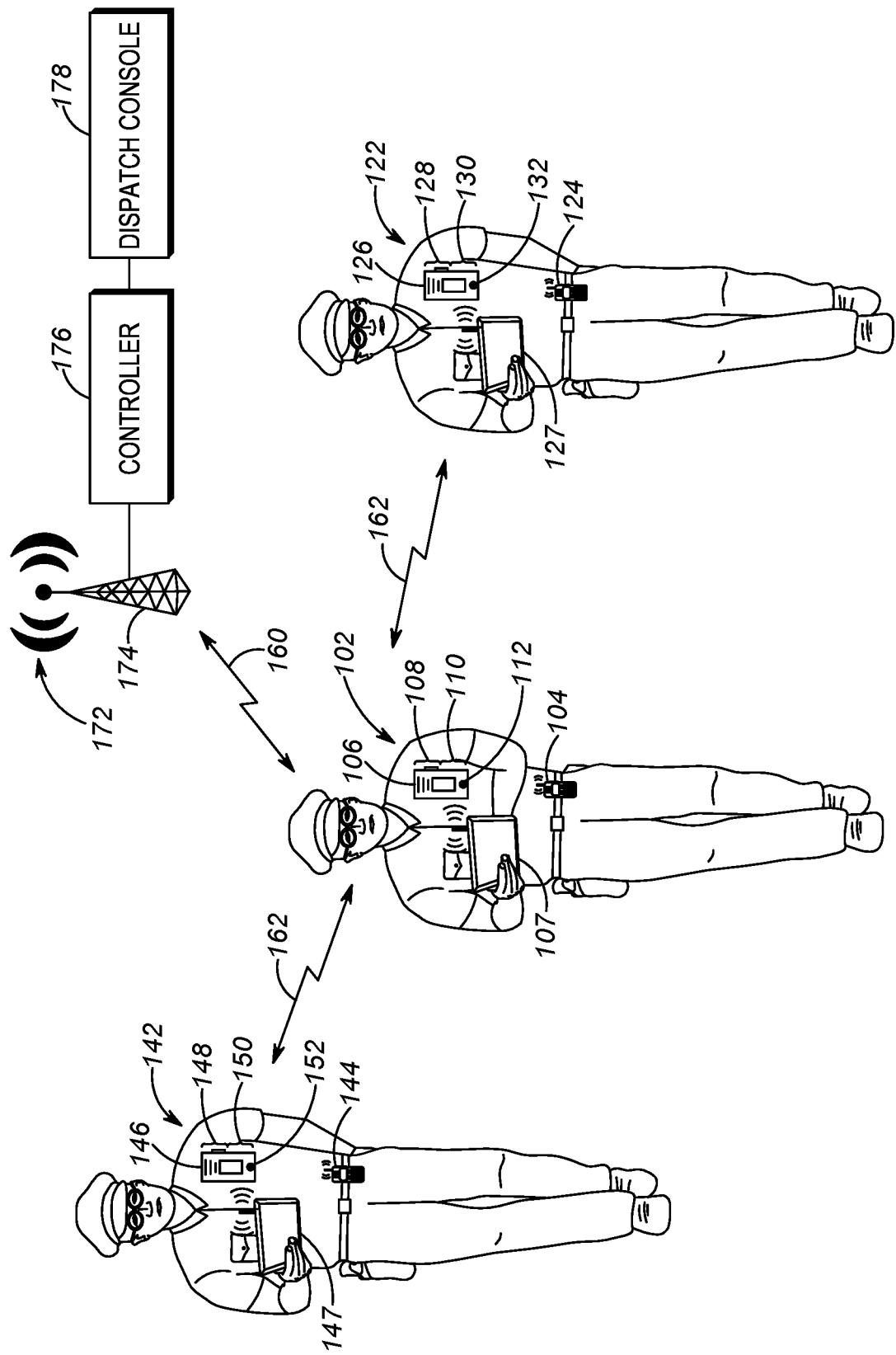
FIG. 1 is a system diagram illustrating a device and system in which security access permissions may be transferred, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for transferring security access permissions between in-camera users.

In one embodiment a process for transferring security access permissions between in-camera users includes: capturing, via an image capture device coupled to the electronic computing device, an image of two or more in-camera users within a field of view of the image capture device; identifying, in the image and at the electronic computing device, at least a first in-camera user and a second in-camera user of the two or more in-camera users; detecting, by the electronic computing device, an input gesture identifying the first in-camera user in the image as a source of security access permissions and the second in-camera user in the image as a destination of security access permissions and responsively: causing, by the electronic computing device, a first particular security access permission for one of the first in-camera user and a first mobile electronic computing device associated with the first in-camera user to be applied to and modify a current set of security access permissions for one of the second in-camera user and a second mobile electronic computing device associated with the second in-camera user.

In a further embodiment an electronic computing device for transferring security access permissions between in-camera users includes: a memory storing non-transitory computer-readable instructions; a transceiver; and one or more processors configured to, in response to executing the non-transitory computer-readable instructions, perform a first set of functions comprising: capture, via an image capture device coupled to the electronic computing device, an image of two or more in-camera users within a field of view of the image capture device; identify, in the image, at least a first in-camera user and a second in-camera user of the two or more in-camera users; detect an input gesture identifying the first in-camera user in the image as a source of security access permissions and the second in-camera user in the image as a destination of security access permissions and responsively: cause, via the transceiver, a first particular security access permission for one of the first in-camera user and a first mobile electronic computing device associated with the first in-camera user to be applied to and modify a current set of security access permissions for one of the second in-camera user and a second mobile electronic computing device associated with the second in-camera user.

In a still further embodiment, a system for transferring security access permissions between in-camera users includes: a mobile electronic computing device comprising: a memory storing non-transitory computer-readable instructions; a transceiver; and one or more processors configured to, in response to executing the non-transitory computer-readable instructions, perform a first set of functions comprising: capture, via an image capture device coupled to the electronic computing device, an image of two or more in-camera users within a field of view of the image capture device; identify, in the image, at least a first in-camera user and a second in-camera user of the two or more in-camera users; detect an input gesture identifying the first in-camera user in the image as a source of security access permissions and the second in-camera user in the image as a destination of security access permissions and responsively: transmit, via the transceiver, in instruction to an infrastructure computing device to cause a first particular security access permission for one of the first in-camera user and a first mobile electronic computing device associated with the first in-camera user to be applied to and modify a current set of security access permissions for one of the second in-camera user and a second mobile electronic computing device associated with the second in-camera user; the infrastructure computing device comprising: a second memory storing second non-transitory computer-readable instructions; a second transceiver; and one or more second processors configured to, in response to executing the second non-transitory computer-readable instructions, perform a second set of functions comprising: receive, via the transceiver, the instruction from the mobile electronic computing device to cause a first particular security access permission for one of the first in-camera user and a first mobile electronic computing device associated with the first in-camera user to be applied to and modify a current set of security access permissions for one of the second in-camera user and a second mobile electronic computing device associated with the second in-camera user; and responsive to receiving the instruction, modify the current set of security access permissions for one of the second in-camera user and a second mobile electronic computing device associated with the second in-camera user to match the first particular security access permission for one of the first in-camera user and a first mobile electronic computing device associated with the first in-camera user.

Each of the above-mentioned embodiments will be discussed in more detail below, starting with example communication system and device architectures of the system in which the embodiments may be practiced, followed by an illustration of processing steps for achieving the improved method, device, and system for transferring security access permissions between in-camera users. Further advantages and features consistent with this disclosure will be set forth in the following detailed description, with reference to the figures.

1. Communication System and Device Structures a. Communication System Structure

Referring now to the drawings, and in particular FIG. 1, a communication system diagram illustrates a system of devices including a first set of devices that a first user 102 (illustrated in FIG. 1 as a first responder police officer) may wear, a second set of devices that a second user 122 (illustrated in FIG. 1 as a second responder police officer) may wear, a third set of devices that a third user 142 (illustrated in FIG. 1 as a third responder police officer) may wear, and a wireless infrastructure radio access network (RAN) 152.

The first set of devices may include a first primary battery-powered portable radio 104 used for narrowband and/or broadband direct-mode or infrastructure communications, a first battery-powered radio speaker microphone (RSM) video capture device 106, and/or a first tablet device 107 having an integrated video camera and used for data applications such as incident support applications.

The second set of devices may include a second primary battery-powered portable radio 124 used for narrowband and/or broadband direct-mode or infrastructure communications, a second battery-powered RSM video capture device 126, and/or a second tablet device 127 having an integrated video camera and used for data applications such as incident support applications.

The third set of devices may include a third primary battery-powered portable radio 144 used for narrowband and/or broadband direct-mode or infrastructure communications, a third battery-powered RSM video capture device 146, and/or a third tablet device 147 having an integrated video camera and used for data applications such as incident support applications.

Each of the first, second, and third portable radios 104, 124, 144, first, second, and third RSM video capture devices 106, 126, 146, and first, second, and third tablet devices 107, 127, 147 may be mobile electronic computing devices capable of directly wirelessly communicating via direct-mode wireless link(s) 162, and/or may be capable of wirelessly communicating via the wireless infrastructure RAN 152 over infrastructure wireless link(s) 160.

In some embodiments, the wireless link(s) 160, 162 may be replaced by wired ad-hoc or infrastructure links, such as an Ethernet link, a USB link, or similar link configurable to communicate via a twisted pair wire, a coaxial cable, a fiber-optic link, or a similar physical connection via a wireline network, and each of the first, second, and third portable radios 104, 124, 144, first, second, and third RSM video capture devices 106, 126, 146, and first, second, and third tablet devices 107, 127, 147 may be capable of directly wiredly communicating via ad-hoc wired links, and/or may be capable of wiredly communicating via infrastructure wired links.

The first, second, and third portable radios 104, 124, 144 may be any mobile electronic computing device used for infrastructure RAN or direct-mode media (e.g., voice, audio, video, etc.) or control signal communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile electronic computing devices and/or the infrastructure RAN 152. The long-range transmitter may implement a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of long-range wireless protocols could be implemented as well.

In the example of FIG. 1, the portable radios 104, 124, 144 may form a hub of communication connectivity for the respective user 102, 122, 142 through which other accessory devices, such as biometric sensors, activity trackers, weapon status sensors, heads-up-displays, respective RSM video capture devices 106, 126, 146 and/or respective tablet devices 107, 127, 147 may communicatively couple.

In order to communicate with and exchange video, audio, and other media and communications with the respective RSM video capture device 106, 126, 146 and/or the respective tablet devices 107, 127, 147 the portable radios 104, 124, 144 may further contain one or more physical electronic ports (such as a USB port, an Ethernet port, an audio jack, etc.) for direct electronic coupling with the respective RSM video capture device 106, 126, 146 or respective tablet devices 107, 127, 147 device, and/or may contain a short-range transmitter (e.g., in comparison to the long-range transmitter such as a LMR or Broadband transmitter) and/or transceiver for wirelessly coupling with the respective RSM video capture device 106, 126, 146 or respective tablet devices 107, 127, 147 device. The short-range transmitter may be a Bluetooth, Zigbee, or NFC transmitter having a transmit range on the order of 0.01-100 meters, or 0.1-10 meters. In other embodiments, the RSM video capture devices 106, 126, 146 and/or tablet devices 107, 127, 147 may contain their own long-range transceivers and may communicate with one another and/or with the infrastructure RAN 152 directly without passing through respective portable radios 104, 124, 144.

The respective RSM video capture devices 106, 126, 146 provide voice functionality features similar to a traditional RSM, including one or more of acting as a remote microphone that is closer to the respective user's 102, 122, 142 mouth and for recording ambient audio including interviewee voice audio, providing a remote speaker allowing play back of audio closer to the user's 102, 122, 142 ear, and including a push-to-talk (PTT) switch or other type of PTT input. The voice and/or audio recorded at the remote microphone may be provided to the respective portable radio 104, 124, 144 for storage and/or further analysis or for further transmission to other mobile communication devices or the infrastructure RAN 152 or may be directly transmitted by the respective RSM video capture device 106, 126, 146 to other mobile electronic computing devices or the infrastructure RAN 152. The voice and/or audio played back at the remote speaker may be received from the respective portable radio 104, 124, 144 or received directly from one or more other mobile electronic computing devices or the infrastructure RAN 152. The RSM video capture devices 106, 126, 146 may include a separate physical PTT switch 108, 128, 148 that functions, in cooperation with the respective portable radio 104, 124, 144 or on its own, to maintain the portable radio 104, 124, 144 and/or RSM video capture device 106, 126, 146 in a monitor only mode, and which switches the device to a transmit-only mode (for half-duplex devices) or transmit and receive mode (for full-duplex devices) upon depression or activation of the PTT switch 108, 128, 148. The portable radio 104, 124, 144 and/or respective RSM video capture device 106, 126, 146 may form part of a group communications architecture that allows a single mobile electronic computing device to communicate with one or more group members (not shown) associated with a particular group of devices at a same time.

Additional features may be provided at the RSM video capture devices 106, 126, 146 as well. For example, display screens 110, 130, 150 may be provided for displaying images, video, and/or text to the respective user 102, 122, 142. The display screen 110, 130, 150 may be, for example, a liquid crystal display (LCD) screen or an organic light emitting display (OLED) display screen. In some embodiments, a touch sensitive input interface may be incorporated into the display screen 110, 130, 150 as well, allowing the respective user 102, 122, 142 to interact with content provided on the display screen 110, 130, 150. A soft PTT input may also be provided, for example, via such a touch interface.

A video camera 112, 132, 142 may also be provided at each respective RSM video capture device 106, 126, 146 integrating an ability to capture images and/or video and store the captured image data (for further analysis) or transmit the captured image data as an image or video stream to the respective portable radio 104, 124, 144 and/or to other mobile electronic computing devices or to the infrastructure RAN 152 directly. The video camera 112, 132, 142 and RSM remote microphone may be used, for example, for capturing audio and/or video of other users 102, 122, 142 and storing the captured image and/or audio data for further analysis (including but not limited to for transferring security access permissions between in-camera users) or transmitting the captured image and/or audio data as a video and/or audio stream to the respective portable radio 104, 124, 144 and/or to other mobile electronic computing devices or to the infrastructure RAN 152 directly for further analysis (including but not limited to for performing portions of the herein disclosed functions for transferring security access permissions between in-camera users). Although only a front-facing camera is illustrated in FIG. 1, in other embodiments, a rear-facing camera may be included in each of the RSM video capture device 106, 126, 146 as well.

Each tablet device 107, 127, 147 may be any wired or wireless computing device used for infrastructure RAN or direct-mode media (e.g., voice, audio, video, etc.) communication via a long-range or short-range wireless transmitter or wired transmitter with other mobile electronic computing devices and/or the infrastructure RAN 152. Each tablet device 107, 127, 147 includes a display screen for displaying a user interface to an operating system and one or more applications running on the operating system, such as a broadband PTT communications application, a web browser application, an outstanding warrant database application, a locationing, mapping, and/or navigation application, a health information database application, or other types of applications that may require user interaction to operate, including the steps and processes set forth herein. The tablet device 107, 127, 147 display screen may be, for example, an LCD screen or an OLED display screen. In some embodiments, a touch sensitive input interface may be incorporated into the display screen as well, allowing the respective user 102, 122, 142 to interact with content provided on the display screen. A soft PTT input may also be provided, for example, via such a touch interface.

Front and/or rear-facing video cameras may be provided at each tablet device 107, 127, 147 integrating an ability to capture video and/or audio of the respective user 102, 122, 142 and the user's 102, 122, 142 surroundings, or of other users 102, 122, 142 and the other users' surroundings, and store and/or otherwise process the captured video and/or audio for further analysis (including but not limited to for transferring security access permissions between in-camera users) consistent with this disclosure or transmit the captured video and/or audio as a video and/or audio stream to the respective portable radio 104, 124, 144, to other mobile electronic computing devices, and/or to the infrastructure RAN 152 for further transmission or analysis (including but not limited to for performing all or portions of the herein disclosed functions for transferring security access permissions between in-camera users) consistent with this disclosure.

Although RSMs 106, 126, 146 and tablet devices 107, 127, 147 are illustrated in FIG. 1 as providing example video cameras and/or microphones for generating audio and/or video streams for use in real-time interface for allowing transference of security access permissions between in-camera users, in other embodiments, other types of cameras and/or microphones could be used as well, including but not limited to, portable stand-alone video cameras and/or microphones, security cameras and/or microphones, air-based drone-attached video cameras and/or microphones, or other types of audio and/or video recording devices with an integrated computing device consistent with this disclosure or communicably coupled via a wired or wireless network interface to an electronic computing device for operating on the provided video and/or audio stream consistent with this disclosure. Furthermore, although RSMs 106, 126, 146 and tablet devices 107, 127, 147 are described above with respect to a single video capture element and single microphone, in other embodiments, each RSM 106, 126, 146 and/or tablet device 107, 127, 147 may include an array of video capture elements and/or microphones for capturing video and/or audio of multiple fields of view, including but not limited to for the purposes of identifying an originating direction of received sound via an array of microphones, among other possibilities.

Infrastructure RAN 152 may implement over wireless link(s) 160 a conventional or trunked LMR standard or protocol such as DMR, a P25 standard defined by the APCO, TETRA, or other LMR radio protocols or standards. In other embodiments, infrastructure RAN 152 may additionally or alternatively implement over wireless link(s) 160 an LTE protocol including MBMS, an OMA-PoC standard, a VoIP standard, or a PoIP standard. In still further embodiments, infrastructure RAN 152 may additionally or alternatively implement over wireless link(s) 160 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the portable radios 104, 124, 144, RSM video capture devices 106, 126, 146, and tablet devices 107, 127, 147 via a single fixed terminal 174 coupled to a controller 176 (e.g., radio controller, call controller, PTT server, zone controller, MME, BSC, MSC, site controller, Push-to-Talk controller, or other network device) and including a dispatch console 178 operated by a dispatcher.

The controller 176 illustrated in FIG. 1 may additional or alternatively operate as a back-end image or video processing electronic computing device or remote (perhaps cloud-based) storage device, electronically storing access control lists (ACLs), cryptographic keys, user credentials, and/or mappings consistent with the remainder of this disclosure.

Figure 2:
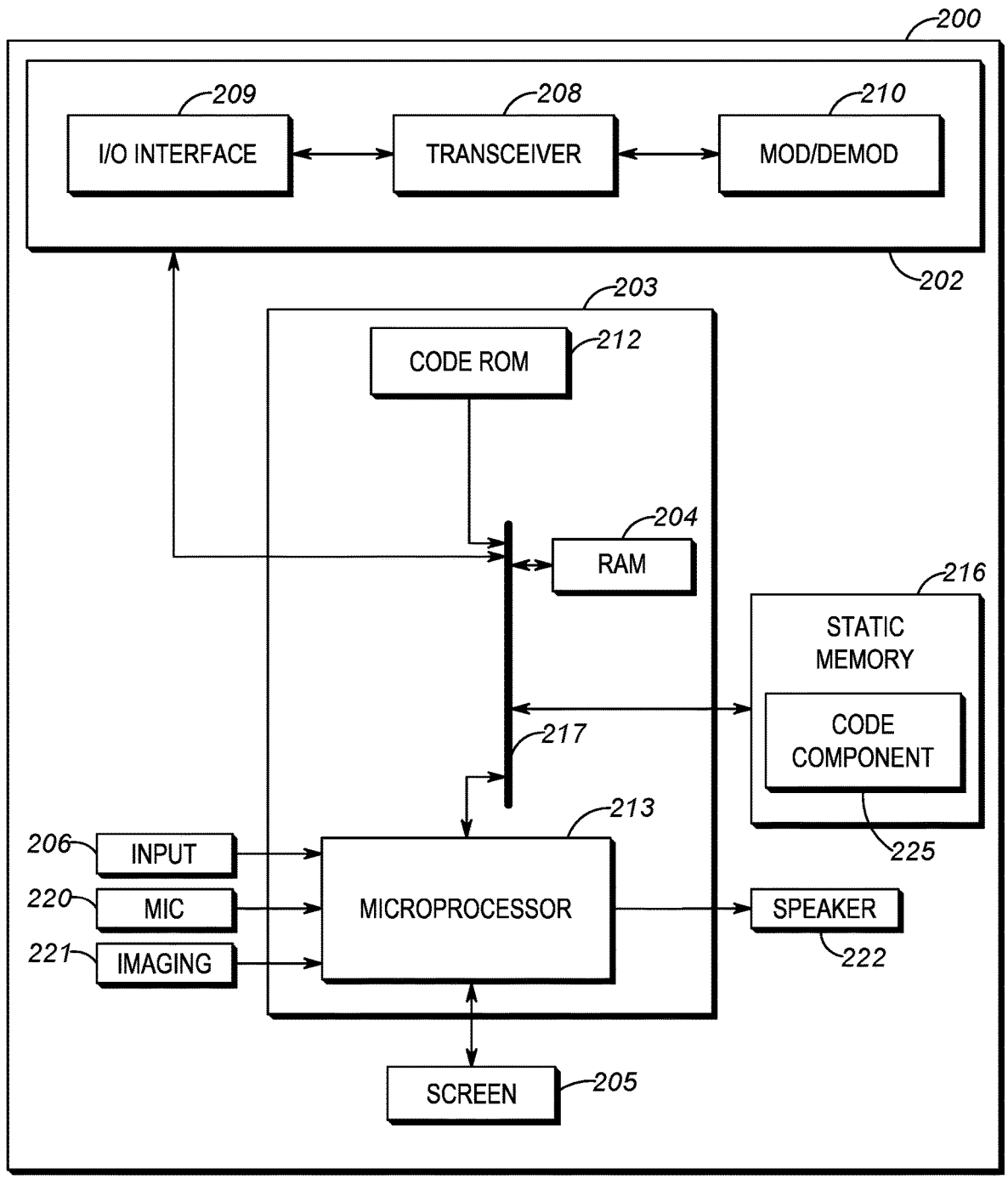
FIG. 2 is a device diagram showing a device structure of an electronic computing device in accordance with some embodiments.

Referring to FIG. 2, a schematic diagram illustrates an electronic computing device 200 according to some embodiments of the present disclosure. Electronic computing device 200 may be, for example, the same as or similar to one of the portable radios 104, 124, 144, one of the RSM video capture devices 106, 126, 146, one of the tablet devices 107, 127, 147, or the controller 176 of FIG. 1, and/or may be a distributed electronic computing device across two or more of the foregoing and linked via wired and/or wireless communication link(s). As shown in FIG. 2, electronic computing device 200 includes a communications unit 202 coupled to a common data and address bus 217 of a processing unit 203. The electronic computing device 200 may also include an input unit (e.g., keypad, pointing device, touch-sensitive surface, etc.) 206 and a display screen 205, each coupled to be in communication with the processing unit 203. In some embodiments, the input unit 206 and display screen 205 may be integrated into a same single device element.

A microphone 220 may be present for capturing audio from a user (e.g., interviewer) and/or civilian (e.g., interviewee) that is further processed by processing unit 203 in accordance with the remainder of this disclosure and/or is transmitted as voice stream data by communication unit 202 to other electronic computing devices for further processing. An imaging device 221 may provide video (still or moving images) of an area in a field-of-view of the electronic computing device 200 for further processing by the processing unit 203 and/or for further transmission by communications unit 202 and processing by other electronic computing devices. A communications speaker 222 may be present for reproducing audio that is decoded from voice streams of voice calls received via the communication unit 202 from digital audio stored at the electronic computing device 200, from other ad-hoc or direct mode electronic computing devices, and/or from an infrastructure RAN device. The screen 205 may be present for indicating status of various computing device functions or features, for displaying and/or highlighting (in some fashion) faces identified in a video stream captured by the electronic computing device 200 or another video capture device communicatively coupled to the electronic computing device 200, and/or for receiving user input relative to the identified users and for transferring security access permissions as a function of the identified in-camera users consistent with this disclosure.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, RSM, tablet, or wireless RAN.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the electronic computing device steps set forth in FIG. 3 and accompanying text and/or displays one or more of the user interface elements set forth in FIGS. 4A-4C. Static memory 216 may also store, permanently or temporarily, facial models for detecting captured in-camera user faces or matching captured in-camera user faces via a facial recognition algorithm to corresponding user identification information associated with each identified user (such as names, unique identifiers, etc.) and/or second information that sets forth security access permissions associated with each unique identified user (if any) relative to one or more limited access database and/or limited access functions. Static memory 216 may also store, permanently or temporarily, electronic mappings consistent with the remainder of this disclosure.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
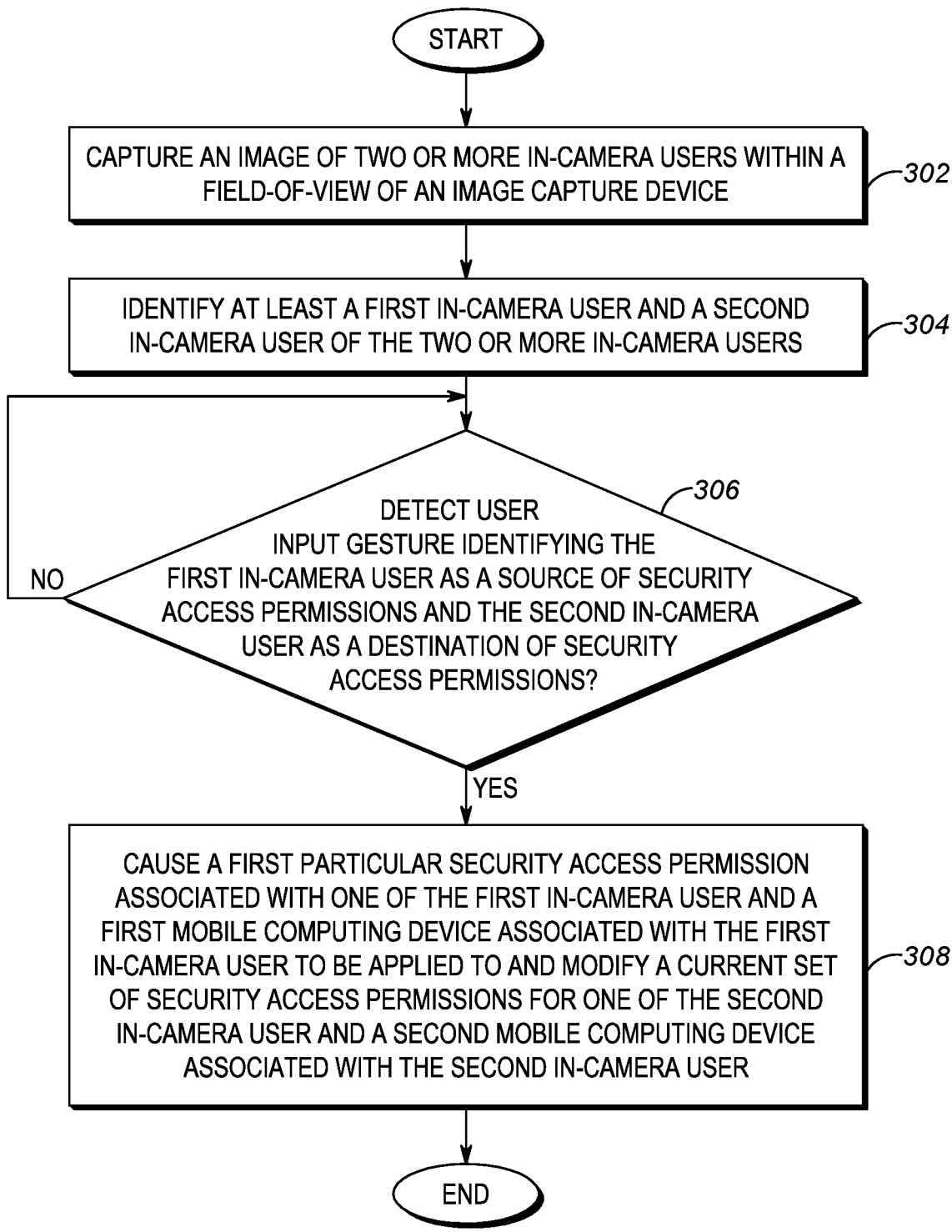
FIG. 3 illustrates a flow chart setting forth process steps for operating the electronic computing device(s) of FIGS. 1 and/or 2 for transferring of security access permissions between in-camera users, in accordance with some embodiments.

2. Processes for Transferring Security Access Permissions Between In-Camera Users Turning now to FIG. 3, a flowchart diagram illustrates a process 300 for an electronic computing device for transferring security access permissions between in-camera users. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure.

The electronic computing device executing process 300 may include an edge device same or similar to any one or more of the portable radio 104, the RSM 106, or the tablet 107 illustrated in FIG. 1, may include an infrastructure device same or similar to the controller 176 of FIG. 1 executing all or some portions of the process 300 as set forth below, or may include two or more of the foregoing operating in a distributed computing manner, among other possibilities.

Figure 4A:
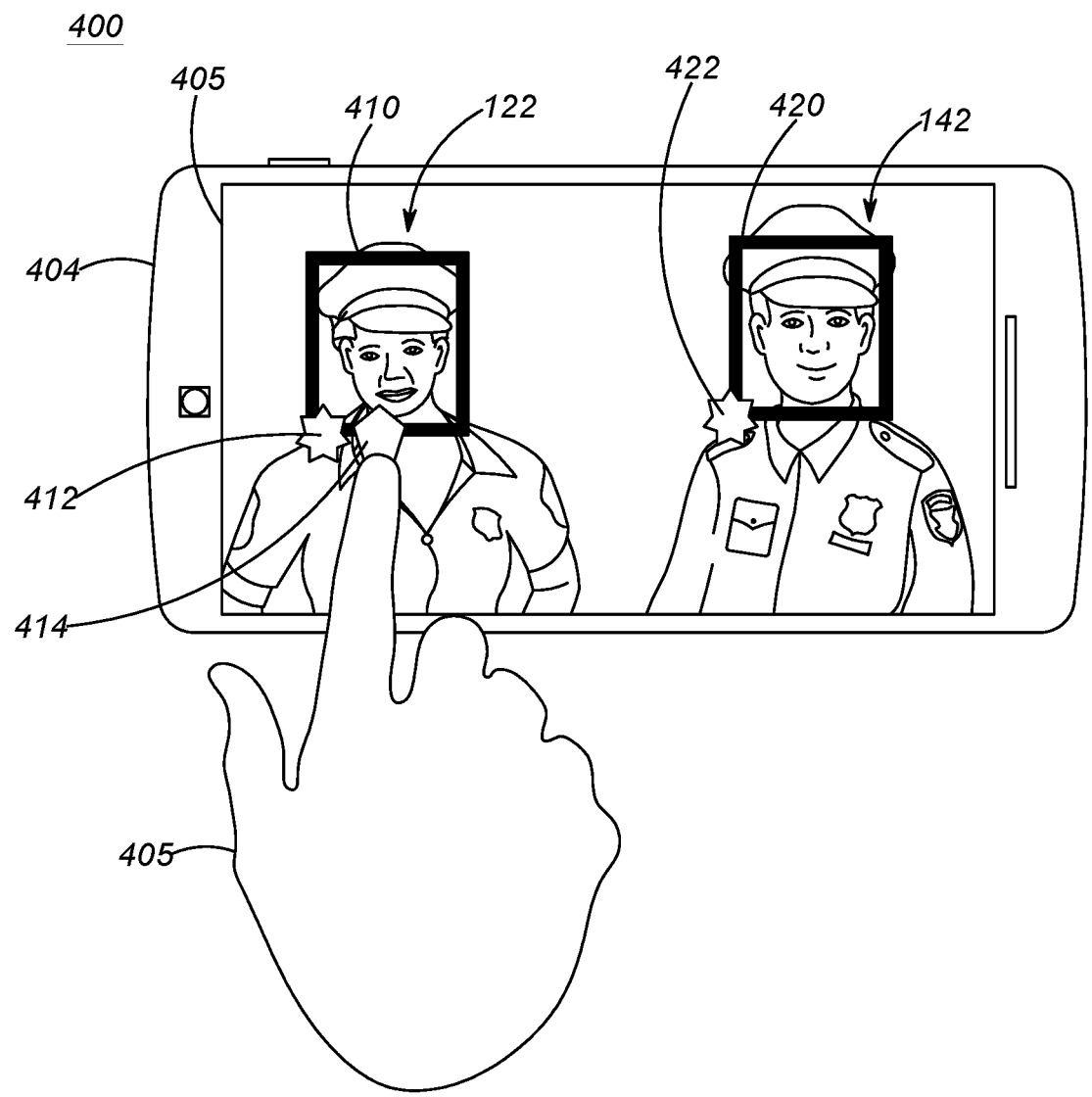
FIGS. 4A-4C illustrate example user interfaces consistent with the process set forth in FIG. 3 for effectuating the transferring of security access permissions between in-camera users, in accordance with some embodiments.

Process 300 begins at step 302, where the electronic computing device captures an image of two or more in-camera users within a field-of-view of an image capture device integrated with or communicatively coupled to the electronic computing device. For example, and as illustrated in the device layout 400 of FIG. 4A, a user such as user 102 of FIG. 1 may operate his or her personal electronic computing device 404, which may include one or more of the portable radio 104, video RSM 106, tablet 107 of FIG. 1 or the electronic computing device 200 of FIG. 2, to capture a scene including two or more in-camera users, which as shown in FIG. 4A, may include user 122 of FIG. 1 as a first in-camera user and user 142 of FIG. 1 as a second in-camera user, at a display portion 405 of the personal electronic computing device 404. Although two users other than the user 102 operating the personal electronic computing device 404 and captured via a single rear-facing image capture device are shown in the display portion 405 of FIG. 4A, in other embodiments, front and rear-facing cameras of personal electronic computing device 404 may be used to capture both of the one or more users 122, 142 via a rear-facing image capture device and of the user 102 of the personal electronic computing device 404 via a front-facing image capture device, and the personal electronic computing device 404 may be configured to overlay image and/or video captured via the front-facing camera on image and/or video captured via the rear-facing camera (or vice versa) so that users 102, 122, 142 could all be displayed simultaneously at display portion 405. Other methods of displaying both front and rear-facing image and/or video streams may be implemented as well, such as via separated side-by-side horizontal or vertical image or video streams. Furthermore, other physical displays could be used in displaying the captured image and/or video, such as an augmented-reality (AR) glasses that capture images and/or video solely for the purposes of identifying the first and second in-camera users and indicating their location in a pass-through augmented reality display (e.g., AR glasses) via indicators in any manner as set forth herein.

The personal electronic computing device 404 may be caused to begin capturing image and/or videos of in-camera users and displaying it at display portion 405 for purposes of transferring security access permissions responsive to the user 102 activating a particular image/video-based security access permission transfer function via a hard or soft-button at personal electronic computing device 404 particularly associated with transferring security access permissions between in-camera users. In other embodiments, personal electronic computing device 404 may be caused to begin capturing image and/or videos and displaying it at display portion 405 for purposes of transferring security access permissions between in-camera users as a default function whenever the image capture device is activated (and perhaps also when two or more faces are identified within the front and/or rear-facing image capture device field-of-views consistent with the next step 306, among other possibilities). In still other embodiments, personal electronic computing device 404 may be caused to begin capturing image and/or videos and displaying it at display portion 405 for purposes of transferring security access permissions responsive to wirelessly receiving a request from one of the users 122, 142 or an electronic computing device associated with one of the users 122, 142 (or, for that matter, from a dispatcher at dispatch console 178), to transfer a particular security access permission to one of the users 122, 142 or an electronic computing device associated therewith.

Processing then proceeds to step 304, where the electronic computing device identifies at least a first in-camera user and a second in-camera user of the two or more in-camera users. Identifying the first in-camera user and the second in-camera user in this context means identifying that the image and/or video being displayed at the electronic computing device includes a portion of a first identifiable user that may act as a source of security access permissions (e.g., the user himself or herself or electronic computing device associated therewith) to transfer from and a portion of a second identifiable user that may act as a destination of security access permissions (e.g., the user himself or herself or electronic computing device associated therewith) to transfer to.

Identifying the first and second in-camera users may be performed at the electronic computing device itself, or at a remote computing device such as controller 176 of FIG. 1 responsive to the electronic computing device providing the captured image and/or video to the electronic computing device and receiving, in return, an indication of the identities of the first and second in-camera users.

Identifying the first and second in-camera users may include applying video analytics on the captured image and/or video to identify first and second faces (e.g., face detection and not facial recognition) associated with the first and second in-camera users. Mapping the identified first and second faces to unique identities associated with the first and second in-camera users (e.g., facial recognition), such as unique names, social security numbers, employee numbers, etc., may be performed at this step as well (via a local or remotely stored facial-recognition database) or may be performed at a later step after a user input gesture is detected at step 306.

Additionally or alternatively, other elements or objects in the captured image or video may be used to identify the first and second in-camera users, such as identifying a known uniform and/or nametag or badge with each of the first and/or second in-camera users, or detecting unique full torsos, body part ratios, or other user-detecting or user-identifying features. In still other embodiments, audio analytics and directional microphones may be used to identify unique user voices in a field-of-view of the image capture device, and location information from the array of microphones used to identify the first and second users within the displayed field of view.

As shown in FIG. 4A, once the first and second in-camera users are identified in the displayed image and/or video (e.g., perhaps via a face detection or facial recognition algorithm), the personal electronic computing device 404 may display user indicators 410, 420 associated with the first and second in-camera users in display portion 405 to aid the user 102 in selecting and transferring security access permissions between them. The locations within the image and/or video to display the user indicators 410, 420 may be determined by the facial detection or facial recognition algorithm, and the user indicators 410, 420 displayed by the personal electronic computing device as a function of the locations. In the event user features other than faces are used to detect or recognize a user, indicators may be modified to identify and/or surround such other user features.

Although the user indicators 410, 420 are illustrated in FIG. 4A as rectangles, in other embodiments, other types of indicators could be used, such as other geometric shapes, or some other mechanism could be used as well or instead (such as a visual coloring or highlighting or a brightness or contrast modification within the locations, etc.). Furthermore, although the user indicators 410, 420 are illustrated in FIG. 4A as displayed on a physical LCD or OLED display, such user indicators 410, 420 could alternatively be displayed via a pass-through augmented reality display (e.g., glasses) commensurate with an identified location of the first and second in-camera users identified via a corresponding image capture device associated with the augmented reality display. Other possibilities exist as well.

When the video analytics are instead performed by a remote computing device such as such as controller 176 of FIG. 1, the remote computing device may provide back to the electronic computing device executing process 300 indications of locations within the image and/or video where the first and second in-camera users are located (such that the electronic computing device can generate and display the user indicators 410, 420 itself), or may return to the electronic computing device modified images and/or video that include the user indicators 410, 420 added to the modified image and/or video for display, for example, in display portion 405 of personal electronic computing device 404.

In some embodiments, and where unique identities of the first and second in-camera users are determined at step 304 via, for example, a user identification algorithm such as a facial recognition algorithm, the electronic computing device may also access a local or remote database of security access permissions for each of the identified first and second in-camera users and display, on or adjacent the user indicators 410, 420, visual or textual representations of current security access permissions associated with each of the first and second in-camera users. Additionally or alternatively, images and/or video of the first and second in-camera users may be provided to a remote computing device such as controller 176 of FIG. 1, which may perform the user identification and access a local (at the controller 176) or remote (in the cloud, for example) database of security access permissions for each of the identified first and second in-camera users and provide the security access permissions information to the electronic computing device for display or provide modified images and/or video with the security access permissions information already embedded therein for display.

For example, and as shown in FIG. 4A, the personal electronic computing device 404 may retrieve, locally or remotely, respective current security access permissions associated with the in-camera first and second users 122 and 142 and display indications of such security access permissions accompanying respective user indicators 410, 420. As one example, security access permission indicators 412, 422 may be associated with an access permission for accessing a limited access information database that is an outstanding warrant database, which each of the in-camera first and second users 122 and 142 currently have access to, and each of the in-camera first and second users 122 and 142 may display the security access permission indicator 412, 422 indicative of such permissions accompanying associated displayed user indicators 410, 420 as illustrated. Of course, and in other embodiments, different types of indicators (e.g., including shapes and different types, such as textual indicators that describe the particular permission, function, or database, such as "warrant database", or which may describe a level of priority such as "high," "low," "commander level," "civilian level," etc.) may be displayed in place of the security access permission indicators 412, 422 illustrated in FIG. 4A. In the case where a level of priority is indicated, a separate mapping may map each priority level to a particular list of access permission relative to one or more limited-access databases and/or limited access functions.

On the other hand, security access permission indicator 414 may be associated with public safety related access permissions for accessing a list of undercover officers or police informants, which only first in-camera user 122 currently has access to, and the first in-camera user 122 may display the security access permission indicator 414 indicative of such permissions accompanying the associated displayed user indicator 410 as illustrated. Again, and in other embodiments, different types of indicators (e.g., including shapes and different types, such as textual indicators that describe the particular permission, such as "undercover officers database") may be displayed in place of the security access permission indicator 414 illustrated in FIG. 4A. Furthermore, while public safety specific security access permissions and functions are primarily described herein, in other embodiments, non-public-safety security access permissions for accessing limited-access information databases or limited-access functions may be transferred in a same or similar manner as set forth herein, such as security access permissions for access to payroll information for a civilian business or for a re-arranging working hours or shifts function, among other possibilities.

Each of the security access permission indicators 412, 414, and 422 may be manipulable by the user 102 via a detected user input gesture in the manner as described in more detail below and may function to transfer only the security access permission associated with the indicator from the source in-camera user to the destination in-camera user. Additionally or alternatively, each of the user indicators 410, 420 may be manipulable by the user 102 via a detected user input gesture in the manner as described in more detail below and may function to transfer any and/or all of the security access permissions from the source in-camera user to the destination in-camera user (e.g., duplicating the security access permissions associated with the source user and/or devices to the destination user and/or devices or copying any/all of the security access permissions granted to the source user and/or devices, and not already inherited by the destination user and/or devices, to the destination user and/or devices).

In still further embodiments, the electronic computing device may function to capture device identifiers detected over-the-air for any and all computing devices (such as tablets, portable radios, and video RSMs) associated with the first and/or second in-camera users and use such device identifiers as a secondary authentication factor in determining an identity of the first and/or second in-camera users (e.g., in addition to using facial-recognition or some other user identification algorithm as set forth above). Accordingly, the personal electronic computing device 404 of FIG. 4A may capture over-the-air identifiers (e.g., Bluetooth addresses, medium access control (MAC) addresses, etc.) of any and/or all computing devices associated with in-camera users 122, 142 and use the captured over-the-air identifiers to confirm a result of the facial recognition (or other user identification algorithm) result by accessing a local or remotely electronically stored user to device mapping that identifies, for each known user, associated devices and their unique device identifiers. In some embodiments, if facial recognition identifies a particular user in the displayed image and/or video (e.g., one of the first or second in-camera users 122, 142) but no over-the-air device identifiers are detected as associated with the particular user as a function of the mapping, the electronic computing device may disable in-camera transference of security access permissions from the particular user and/or to the particular user, among other possibilities.

Processing then proceeds to step 306, where the electronic computing device detects whether a user input gesture identifying the first in-camera user as a source of security access permissions and the second in-camera user as a destination of security access permissions has been received. In the case of a physical display screen interface, the user input gesture could be a detected user swipe across a touch screen interface from the first in-camera user to the second in-camera user, or a detected tap on the first in-camera user followed by a drag to the second in-camera user and a final tap on the second in-camera user. Other touch-based input gestures could be used as well. In an embodiment in which an augmented reality interface is provided to the user of the electronic computing device, the user input gesture may be a detected pointing by the user at the first in-camera user within a field of view of an image capture device associated with the augmented reality interface followed by a movement of the user's hand to a positioning pointing at the second in-camera user, and wherein some first hand gesture may be used while pointing at the first in-camera user to indicate the first in-camera user as a source of the security access permissions transfer and a second hand gesture may be used while pointing at the second in-camera user to indicate the second in-camera user as a destination of the security access permissions transfer.

Figure 4B:
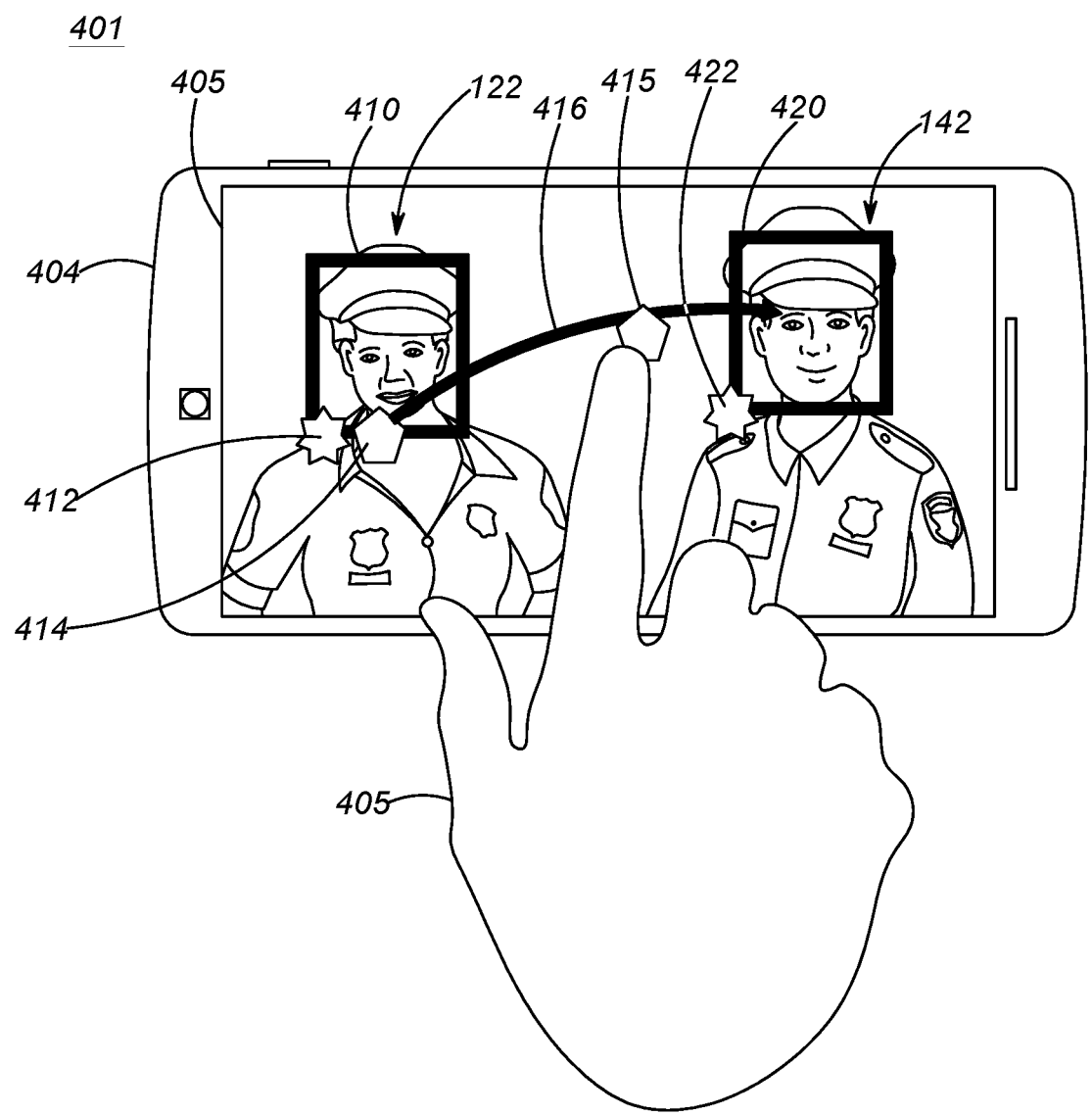

With reference to FIGS. 4A and 4B, the user input gesture may additionally or alternatively include the user 102 using a pointer finger of his or her right hand 405 to select a particular one of the security access permission indicators 412, 414 representing a particular desired security access permissions associated with the first in-camera user 122 that the user 102 wishes to transfer to the second in-camera user 142, and may then slide the selected security access permission indicator 414 from the first in-camera user 122 to the second in-camera user 142 via a dragging motion 416 as indicated in device layout 401 of FIG. 4B. In some embodiments, a new security access indicator 415 may be created (as a copy of security access indicator 414) and dragged along the dragging motion 416, while in other embodiments (not shown), the particular security access indicator 414 may be moved off of user indicator 410 during the dragging motion 416 and returned to its position on user indicator 410 once the transfer is complete, which may then further include the generation of a new copy of the security access indicator 414 placed on user indicator 420 as security access indicator 424 as shown in device layout 402 of FIG. 4C.

A similar process could be used via the augmented reality display (not shown in FIGS. 4A-4C) in which the security access permission indicators 412, 414 may be displayed on user indicators 410, 420 in augmented reality space, and an image capture device may capture the user 102 pointing at the displayed security access permission indicator 414 on the first in-camera (and in-user-view) user 122 in augmented reality space and dragging the security access permission indicator 414 to the second user in-camera (and in-user-view) user 142 in augmented reality space. Other detected gestures could be used as well. Furthermore, while FIGS. 4A-4B illustrate a user input gesture across a static image, in other embodiments, the user input gesture may be detected across a plurality of images constituting a video stream, and wherein the first in-camera user 122 that is a source of the security access permissions may be identified via a first image of the video stream and the second in-camera user 142 that is a destination of the security access permissions may be identified via a second image of the video stream occurring after the first image and displayed in the display portion 405 of the personal electronic computing device 404.

Processing then proceeds to step 308, where the electronic computing device causes a first particular security access permission associated with one of the first in-camera user and a first mobile electronic computing device associated with the first in-camera user to be applied to and modify a current set of security access permissions for one of the second in-camera user and a second mobile electronic computing device associated with the second in-camera user.

In embodiments in which only a user-detection (e.g., face-detection) function was performed at step 304 merely to identify where in the image and/or video frames users appeared for purposes of receiving an input gesture at step 306, and not a full user identification (e.g., facial recognition as set forth above with respect to step 304) for uniquely identifying the users in the image and/or video frames, such identification may be performed at step 308 in response to receiving the input gesture identifying the first in-camera user as the source of the security access permissions transfer and the second in-camera user as the destination of the security access permissions transfer. Further, by performing a user detection algorithm at step 304 and not a user identification algorithm, and instead delaying the user identification algorithm until step 308, additional processing may be saved by refraining from performing user identification on unnecessary users that may not have been indicated by the input gesture at step 306.

At step 308, security access permissions of the second in-camera user (and/or mobile electronic computing devices associated therewith) are then modified as a function of security access permissions of the first in-camera user (and/or mobile electronic computing devices associated therewith). If security access permissions of the first and second in-camera users were previously retrieved at step 304 for purposes of displaying the security access permission indicators 412, 422, only those security access permission(s) associated with the corresponding security access permission indicators 412, 422 manipulated by the user input gesture at step 306 are caused to be modified at step 308.

Figure 4C:
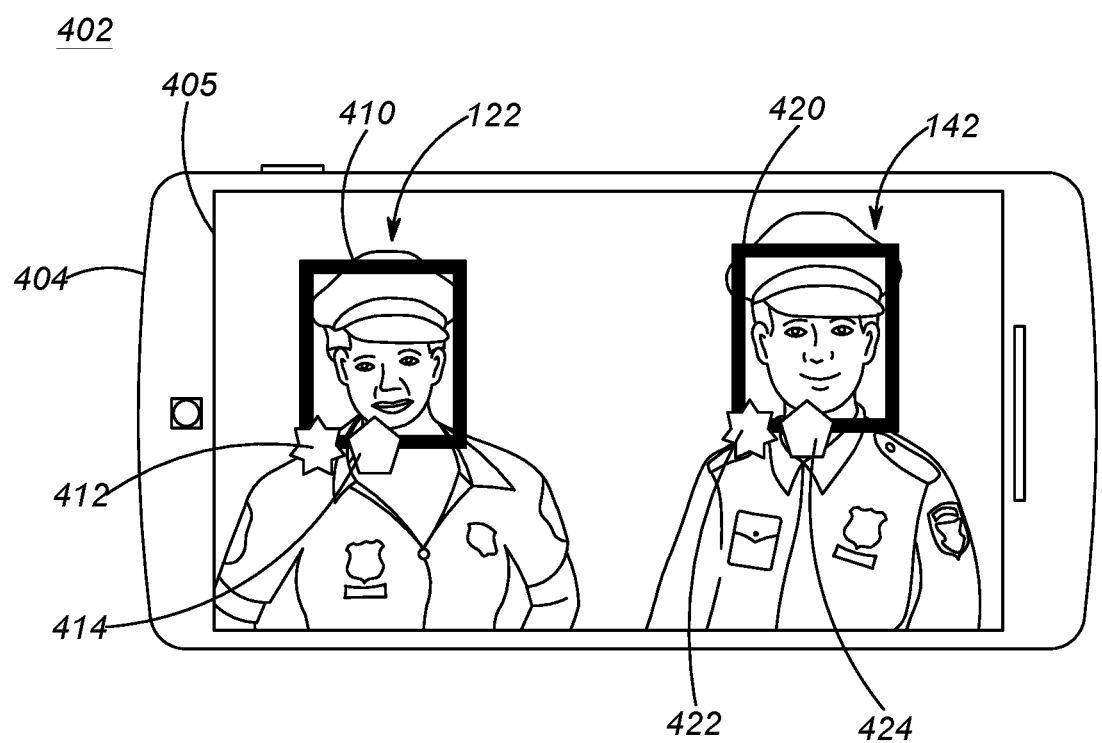

For example, and with reference to FIGS. 4A-4C, a security access permission associated with security access permission indicator 414 (i.e., originally associated with in-camera user 122 and/or a mobile electronic computing device associated with in-camera user 122) may be caused to be copied to in-camera user 142. In an embodiment in which an ACL is maintained in the infrastructure, such as at a remote computing device such as controller 176 of FIG. 1 (or perhaps elsewhere, such as an ad-hoc master/server device), causing the security access permission associated with security access permission indicator 414 to be copied to the second in-camera user 142 and/or a mobile electronic computing device associated therewith may include the electronic computing device transmitting an instruction to the controller 176 via RAN 152 instructing the controller 176 to modify an ACL associated with the second in-camera user 142 (and/or mobile electronic computing devices associated therewith) to include the security access permission associated with security access permission indicator 414. Upon receipt of the instruction, the controller 176 may be configured to modify the ACL associated with the second in-camera user 142 (and/or mobile electronic computing devices associated therewith) to include the security access permission associated with security access permission indicator 414.

In accordance with the example set forth earlier in which the security access permission indicator 414 was associated with an access permission for accessing a limited-access database of undercover officers or police informants, the controller 176 may responsively modify the ACL associated with the second in-camera user 142 (or a mobile electronic computing device associated with the second in-camera user 142) to newly recite positive permissions to access the database of undercover officers or police informants. Additionally, and as set forth in FIG. 4C, a new security access permission indicator 424 may be added to the user indicator 420 indicative of the new permissions provided to the second in-camera user 142 (and/or mobile electronic computing devices associated therewith).

Other methods of causing the security access permission associated with security access permission indicator 414 to be copied to the second in-camera user 142 and/or a mobile electronic computing device associated therewith, may be implemented at electronic computing device as well. For example, where permissions are based on having a cryptographic key relative to the security access permission, the electronic computing device may cause (e.g., directly transmit or cause some other central repository of cryptographic keys to transmit) the cryptographic key associated with security access permission indicator 414 to be provided to the second in-camera user 142 (and/or mobile electronic computing devices associated therewith). In still other embodiments, where permissions are based on having correct credentials to access a particular resource, such as having a correct username or password, and/or challenge statement answer, the electronic computing device may cause (e.g., directly transmit or cause some other central repository of cryptographic keys to transmit) the credentials associated with security access permission indicator 414 to be provided to the second in-camera user 142 (and/or mobile electronic computing devices associated therewith). The cryptographic key or credentials associated with security access permission indicator 414 may be separately encrypted in some other previously agreed upon manner to avoid sending them in the clear.

In some embodiments, the security access permission may be granted with default read-only and/or read/write permissions to the limited-access database it is associated with, or may be transferred with the same type of read-only and/or read/write permissions that were granted to the first in-camera user. In other embodiments, a type of input gesture detected at step 306 (e.g., one finger vs two finger) may determine whether the particular security access permission is transferred as a read-only permission or as a read/write permission. Other possibilities exist as well.

In other embodiments, in which security access permissions and/or indicators are not available or accessible, or in which the electronic computing device is not configured to retrieve security access permissions and/or display security access permission indicators, and in which the input gesture detected at step 306 perhaps instead drags a user indicator such as user indicators 410 associated with the first in-camera user 122 to an area associated with a face or other body part of the second in-camera user 142, or in which the input gesture detected at step 306 perhaps drags from an area associated with a face or other body part associated with the first in-camera user 122 to an area associated with a face or other body part associated with the second in-camera user 142, the electronic computing device may cause all security access permissions associated with the first in-camera user 122 (and/or mobile electronic computing devices associated therewith) to be inherited by (e.g., assuming they do not already exist) the second in-camera user 142 (and/or mobile electronic computing devices associated therewith) in any of the manners already set forth above.

Modifying security access permissions associated with the second in-camera user may subsequently allow the second in-camera user to access additional limited-access databases and/or functions by newly logging into such additional databases and/or functions (e.g., re-authenticating), but may not affect applications and/or services to which the second in-camera user is already logged into. In some embodiments, modifying security access permissions associated with the second in-camera user may also include modifying security access permissions associated with any and all applications and/or services to which the second in-camera user is already logged into, including any and/all applications or services associated with computing devices associated with the second in-camera user, which may then allow the second in-camera user to access the additional limited-access database and/or functions without having to re-authenticate.

At some later point in time, the user 102 may choose to remove one of the security access permissions granted to the second in-camera user 142 via a similar user input gesture as set forth above. For example, and with reference to FIG. 4C, user 102 may subsequently drag the previously newly added security access permission indicator 424 off of the user indicator 420 associated with the second in-camera user 142 and/or back to the first in-camera user 122, or otherwise drag the previously newly added security access permission indicator 424 to a trash can, or take some other action indicative of a desire to remove the security access permission associated with the security access permission indicator 424 from the second in-camera user 142. In response to the electronic computing device detecting such input, the electronic computing device causes the security access permission associated with the security access permission indicator 424 to be rescinded or removed in a similar process to that already set forth above with respect to adding the security access permission associated with the security access permission indicator 424. As just one example, and in response to detecting a user input gesture indicative of a desire to remove the security access permission associated with the security access permission indicator 424 from the second in-camera user 142, the personal electronic computing device 404 may transmit a request to a remote server, such as controller 176 in the RAN 172, requesting removal of the security access permission associated with the security access permission indicator 424 from an ACL associated with the second in-camera user 142 or a mobile electronic computing device associated with the second in-camera user 142. In cases where cryptographic keys or user credentials were shared with the second in-camera user 142, the electronic computing device may cause a re-keying of all keys for the associated limited-access database or function or a retraction of the cryptographic key or credentials shared with the second in-camera user 142, among other possibilities.

In some embodiments, and prior to causing the transfer of security access permissions at step 308 but responsive to detecting the input gesture at step 306, the electronic computing device may prompt a user of the electronic computing device to confirm, via a confirmation input interface of the electronic computing device, that the security access permission indicated via the input gesture at step 306 (or all security access permissions, depending on the input gesture) associated with the first in-camera user (and/or mobile electronic computing devices associated therewith) should be applied to and modify a current set of security access permissions for the second in-camera user (and/or mobile electronic computing devices associated therewith). Only after confirming, via the confirmation input gesture, that the user 102 intended to transfer the security access permissions indicated, may the electronic computing device cause the transfer of security access permissions as set forth in step 308.

In a still further embodiment, and again prior to causing the transfer of security access permissions at step 308 but responsive to detecting the input gesture at step 306, the electronic computing device may separately confirm that the user of the electronic computing device (e.g., the user 102 in FIGS. 4A-4C) has security access permissions for transferring security access permissions in the manner set forth herein (e.g., transferring permissions between in-camera users). Such a confirmation request may be made to an infrastructure controller such as controller 176, and only after receiving confirmation that the user of the electronic computing device has sufficient privilege (e.g., security access permissions) to transfer permissions between in-camera users, may the electronic computing device then perform some or all of steps 304-308. Such confirmation may take the form of a challenge/response, a transfer of user credentials, or the providing of a cryptographic key associated with the in-camera security access permission transfer function, among other possibilities.

3. Conclusion

In accordance with the foregoing, a method, device, and system for transferring security access permissions between in-camera users. As a result of the foregoing, security access permissions for accessing limited-access databases and/or functions may be transferred between other users via a user input gesture on a captured image of in-camera source and destination users, increasing a speed and ease of transference of security permissions, while reducing errors relating to manual data entry and selection of users and corresponding security permissions. Other benefits and advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method at an electronic computing device for transferring security access permissions between in-camera users, the method comprising:

capturing, via an image capture device coupled to the electronic computing device, an image of two or more in-camera users within a field of view of the image capture device;

identifying, in the captured image and at the electronic computing device, at least a first in-camera user and a second in-camera user of the two or more in-camera users; and detecting, by the electronic computing device, an input gesture interacting with the captured image and selecting the first in-camera user in the captured image as a source of security access permissions and selecting the second in-camera user in the captured image as a destination of security access permissions and responsively:

causing, by the electronic computing device, a first particular security access permission for one of the first in-camera user and a first mobile electronic computing device associated with the first in-camera user to be applied to and modify a current set of security access permissions for one of the second in-camera user and a second mobile electronic computing device associated with the second in-camera user.

2. The method of claim 1, wherein identifying, in the captured image and at the electronic computing device, the at least the first in-camera user and the second in-camera user of the two or more in-camera users comprises:

identifying, by the image capture device, a first face of the first in-camera user and a second face of the second in-camera user via one of a facial-recognition and a face-detection algorithm.

3. The method of claim 1, wherein identifying, in the captured image and at the electronic computing device, the at least the first in-camera user and the second in-camera user of the two or more in-camera users comprises:

providing the captured image to a remote computing device and responsively receiving, from the remote computing device, information identifying a first face of the first in-camera user and a second face of the second in-camera user via a facial-recognition algorithm.

4. The method of claim 1, wherein causing, by the electronic computing device, a first particular security access permission for the one of the first in-camera user and the first mobile electronic computing device associated with the first in-camera user to be applied to and modify the current set of security access permissions for the one of the second in-camera user and the second mobile electronic computing device associated with the second in-camera user comprises:

identifying, via a facial-recognition algorithm as a function of the identified first in-camera user and the identified second in-camera user, a user identity of the first in-camera user and a user identity of the second in-camera user; and identifying, via a user identity to device mapping and as a function of the determined user identity of the first in-camera user and the determined user identity of the second in-camera user, the first mobile electronic computing device associated with the first in-camera user and the second mobile electronic computing device associated with the second in-camera user.

5. The method of claim 4, the method further comprising:

capturing, via a transceiver of the electronic computing device, device identifiers captured over-the-air and representing a unique identifier of the first mobile electronic computing device and the second mobile electronic computing device; and using, by the electronic computing device, the captured over-the-air identifiers as a second authentication factor, in addition to the facial-recognition algorithm, in determining the identities of the first and second in-camera users and their associated first and second mobile electronic computing devices.

6. The method of claim 1, wherein the detecting, at the electronic computing device, the input gesture interacting with the captured image and selecting the first in-camera user in the captured image as the source of security access permissions and selecting the second in-camera user in the captured image as the destination of security access permissions comprises detecting, at the electronic computing device, a user swipe from the first in-camera user in the captured image to the second in-camera user in the captured image via a touch screen input on which the captured image is being displayed.

7. The method of claim 6, further comprising displaying, adjacent to or overlaying one of the first in-camera user and a first face of the first in-camera user, one or more security access descriptor icons associated with one or more security access levels or one or more particular secure depots of information, and wherein the user swipe selects one of the security access descriptor icons and moves the selected security access descriptor icon from the first in-camera user to the second in-camera user, and wherein the first particular security access permission is determined as a function of the selected security access descriptor icon.

8. The method of claim 7, further comprising newly displaying, adjacent to or overlaying one of the second in-camera user and a second face of the second in-camera user, the selected security access descriptor icon.

9. The method of claim 8, further comprising detecting, at the electronic computing device, a second input gesture removing the selected security access descriptor icon displayed adjacent to or overlaying the one of the second in-camera user and the second face of the second in-camera user, and responsively causing the first particular security access permission to be removed from the current set of security access permissions for the second mobile electronic computing device associated with the second in-camera user.

10. The method of claim 9, wherein the second input gesture is one of a detected swipe selecting the selected security access descriptor icon displayed adjacent to or overlaying the one of the second in-camera user and the second face of the second in-camera user and moving it back to the first in-camera user, and a detected swipe selecting the selected security access descriptor icon displayed adjacent to or overlaying the one of the second in-camera user and the second face of the second in-camera user and moving it to a deletion icon associated with removing the first particular security access permission associated with the selected security access descriptor icon.

11. The method of claim 1, wherein modifying the current set of security access permissions for the one of the second in-camera user and the second mobile electronic computing device associated with the second in-camera user comprises adding newly granted read-only access to one or more public safety incident-related databases.

12. The method of claim 11, wherein the one or more public safety incident-related databases include one or more of incident-staffing information, incident-related public safety personnel location information, incident-related public safety personnel assigned roles, incident-related public safety personnel contact information, and incident-related public safety radio frequency (RF) channel assignment information.

13. The method of claim 1, wherein modifying the current set of security access permissions for the one of the second in-camera user and the second mobile electronic computing device associated with the second in-camera user comprises adding newly granted access to modify one or more public safety incident-related databases.

14. The method of claim 1, wherein the detecting, at the electronic computing device, the input gesture interacting with the captured image and selecting the first in-camera user in the captured image as the source of security access permissions and selecting the second in-camera user in the captured image as the destination of security access permissions comprises detecting, at the electronic computing device, a user moving a pointing finger across a plurality of subsequent captured images from the first in-camera user to the second in-camera user.

15. The method of claim 14, further comprising, prior to detecting, at the electronic computing device, the user moving the pointing finger across the plurality of subsequent captured images from the first in-camera user to the second in-camera user, detecting activation of a security access permissions transfer function via a separate input gesture at the electronic computing device.

16. The method of claim 15, wherein the separate input gesture is detected via a touch screen interface.

17. The method of claim 1, wherein causing, by the electronic computing device, the first particular security access permission for the one of the first in-camera user and the first mobile electronic computing device associated with the first in-camera user to be applied to and modify the current set of security access permissions for the one of the second in-camera user and the second mobile electronic computing device associated with the second in-camera user comprises:

causing duplicating of all security access permissions associated with the one of the first in-camera user and the first mobile electronic computing device associated with the first in-camera user for the one of the second in-camera user and the second mobile electronic computing device associated with the second in-camera user.

18. The method of claim 1, further comprising, prior to causing, by the electronic computing device, the first particular security access permission for the one of the first in-camera user and the first mobile electronic computing device associated with the first in-camera user to be applied to and modify the current set of security access permissions for the one of the second in-camera user and the second mobile electronic computing device associated with the second in-camera user:

prompting a user of the electronic computing device to confirm, via an input interface of the electronic computing device, that the first particular security access permission for the one of the first in-camera user and the first mobile electronic computing device associated with the first in-camera user is to be applied to and modify the current set of security access permissions for the one of the second in-camera user and the second mobile electronic computing device associated with the second in-camera user, and responsively detecting receipt of confirmation input.

19. An electronic computing device for transferring security access permissions between in-camera users, the electronic computing device comprising:

a memory storing non-transitory computer-readable instructions;

a transceiver; and one or more processors configured to, in response to executing the non-transitory computer-readable instructions, perform a first set of functions comprising:

capture, via an image capture device coupled to the electronic computing device, an image of two or more in-camera users within a field of view of the image capture device;

identify, in the captured image, at least a first in-camera user and a second in-camera user of the two or more in-camera users; and detect an input gesture interacting with the captured image and selecting the first in-camera user in the captured image as a source of security access permissions and selecting the second in-camera user in the captured image as a destination of security access permissions and responsively:

cause, via the transceiver, a first particular security access permission for one of the first in-camera user and a first mobile electronic computing device associated with the first in-camera user to be applied to and modify a current set of security access permissions for one of the second in-camera user and a second mobile electronic computing device associated with the second in-camera user.

20. A system for transferring security access permissions between in-camera users, the system comprising:

a mobile electronic computing device comprising:

a memory storing non-transitory computer-readable instructions;

a transceiver; and one or more processors configured to, in response to executing the non-transitory computer-readable instructions, perform a first set of functions comprising:

capture, via an image capture device coupled to the mobile electronic computing device, an image of two or more in-camera users within a field of view of the image capture device;

identify, in the captured image, at least a first in-camera user and a second in-camera user of the two or more in-camera users; and detect an input gesture interacting with the captured image and selecting the first in-camera user in the captured image as a source of security access permissions and selecting the second in-camera user in the captured image as a destination of security access permissions and responsively:

transmit, via the transceiver, an instruction to an infrastructure computing device to cause a first particular security access permission for one of the first in-camera user and a first mobile electronic computing device associated with the first in-camera user to be applied to and modify a current set of security access permissions for one of the second in-camera user and a second mobile electronic computing device associated with the second in-camera user;

the infrastructure computing device comprising:

a second memory storing second non-transitory computer-readable instructions;

a second transceiver; and one or more second processors configured to, in response to executing the second non-transitory computer-readable instructions, perform a second set of functions comprising:

receive, via the transceiver, the instruction from the mobile electronic computing device to cause a first particular security access permission for one of the first in-camera user and a first mobile electronic computing device associated with the first in-camera user to be applied to and modify a current set of security access permissions for one of the second in-camera user and a second mobile electronic computing device associated with the second in-camera user; and responsive to receiving the instruction, modify the current set of security access permissions for one of the second in-camera user and a second mobile electronic computing device associated with the second in-camera user to match the first particular security access permission for one of the first in-camera user and a first mobile electronic computing device associated with the first in-camera user.

* * * * *